United States Patent [19]
Schleining

[11] 3,897,606
[45] Aug. 5, 1975

[54] SILENT DOOR CLOSING DEVICE

[76] Inventor: John Schleining, 2414 Nina Clare Rd., Billings, Mont. 59102

[22] Filed: Aug. 7, 1974

[21] Appl. No.: 495,412

Related U.S. Application Data

[63] Continuation-in-part of Ser. No. 398,646, Sept. 19, 1973, abandoned.

[52] U.S. Cl. .......................... 16/71; 16/80; 49/386; 49/394; 16/112
[51] Int. Cl.² ........................................... E05F 1/00
[58] Field of Search ............... 16/71, 72, 76, 78, 79, 16/80, 112, 115; 49/386, 394, 400–402, 460

[56] References Cited
UNITED STATES PATENTS
2,610,084   9/1952   Anderson.......................... 16/112 X

*Primary Examiner*—Geo. V. Larkin
*Attorney, Agent, or Firm*—David A. Veeder

[57] ABSTRACT

Disclosed is a silent door closing device consisting of a pivotable lever body which is secured by bracket means to the door of a camper, trailer or other enclosure. The lever includes a spring means attached to the bracket means for the purpose of maintaining the lever body in its normal position. The device facilitates the closing of a trailer, motor home or other type of door and does so silently.

3 Claims, 4 Drawing Figures

SILENT DOOR CLOSING DEVICE

This is a continuation-in-part of my application Ser. No. 398,646, filed Sept. 19, 1973, for Silent Door Closing Device, which is abandoned.

BACKGROUND OF THE INVENTION

1. Field of the Invention

This invention relates to devices for the silent closing of doors. It is especially useful for silently closing travel trailer and motor home doors from the inside.

2. Description of the Prior Art

Other methods of closing doors on vehicles have been employed in the prior art. One typical approach is the use of a pivotally extendable arm mounted on the inside surface of a vehicle door. Anderson U.S. Pat. No. 2,610,084 shows such a device. However, one problem with prior art techniques is that they still require the slamming of the door to effectively close it, and they are cumbersome and difficult to use. It was desired that a solution be found to the problem of silently and effectively closing travel trailer doors and the like which was also inexpensive and easy to install. For these and other reasons, the following invention was perfected.

SUMMARY OF THE INVENTION

This invention relates to devices for closing doors, and more particularly to a silent door closing device for the closing of doors from the inside.

In the present day design of travel trailers and motor homes, the doors are of light construction equipped with cumbersome main and screen door seals to avoid drafts and blowing dirt—the result is that such doors are difficult to close without slamming. It is a prime object of this invention therefore to provide an improved silent door closing device or attachment that can be easily installed whereby the operator can grasp the device and silently exert sufficient force with adequate leverage to close the door.

DRAWINGS

FIG. 1 is a side view of the inside of a conventional travel trailer showing the inside of the trailer door in its closed position, the trailer door having an improved silent door closing device connected thereto; and FIG. 2 is an enlarged side view of the inside of the trailer door shown in FIG. 1 showing the door closing device attached to the inside of the trailer door directly above the standard trailer door handle; and FIG. 3 is a plan view of the mounted silent door closing device shown with the door slightly ajar with the device in an operating position according to the preferred embodiment; and FIG. 4 is a plan view of the mounted silent door closing device shown with the door completely closed as a result of having operated the silent door closing device with the device shown in its unextended position.

DETAILED DESCRIPTION

Figure 1:
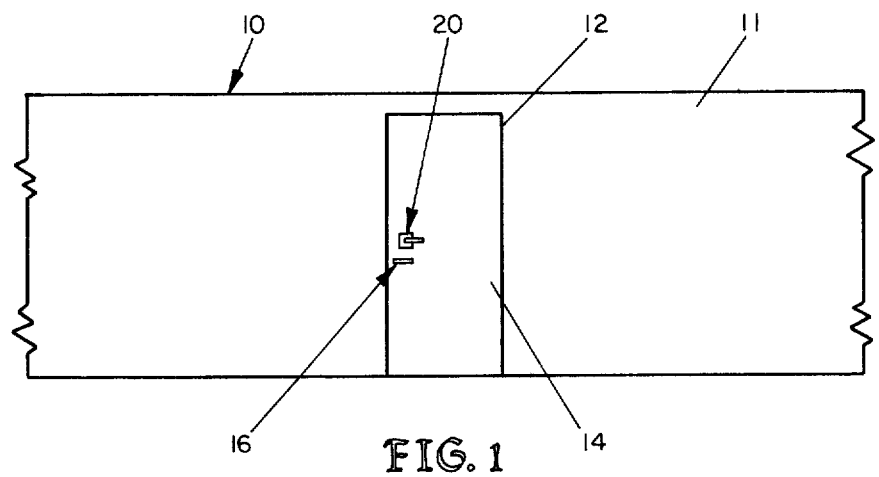

FIG. 1 illustrates a silent door closing device mounted on the inside of a conventional travel trailer door according to the preferred embodiment of the present invention. Referring now to FIG. 1, the invention with which the present specification is concerned is applicable to any door but especially so to conventional travel trailers. A travel trailer of such a type is generally referred to by the reference character 10.

The trailer 10 has an inside wall 11 in which is located a door 14 which is hung in a conventional way in a door frame 12. The door 14 may be opened or closed by an inner door handle 16. The silent door closing device is generally indicated by the reference 20 and is shown in FIG. 1 attached to the inside of the trailer door 14 in a position above the inner door handle 16.

Figure 2:
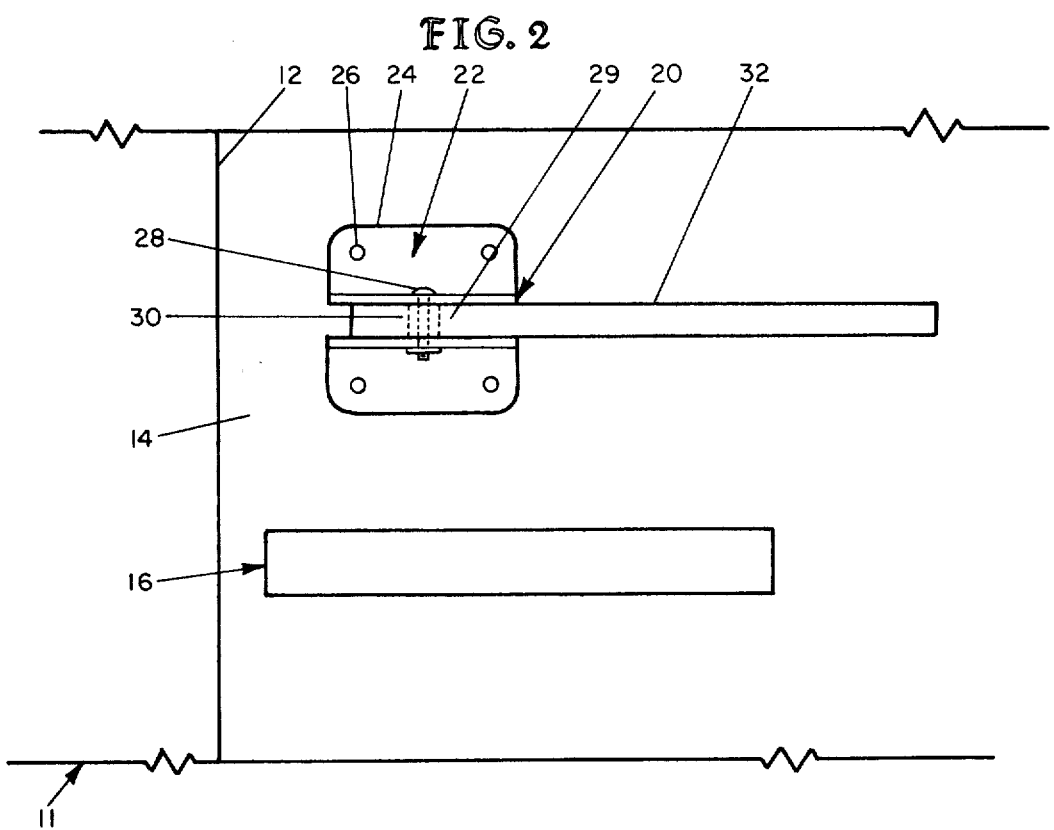

FIG. 2 is an expanded view of the silent door closing device shown attached to the inner side of the trailer door according to the preferred embodiment of the present invention. The device 20 is pivotally connected to a mounting bracket 22 which consists a pair of steel brackets 24 which are secured fixedly by means of suitable fasteners such as sheet metal screws 26 to the inside of the trailer door 14. A bolt fastener 28 and the bushing (shown in phantom) 30 of hub 29 secure the pivotable flat lever body 32 to the bracket means 22.

Figure 3:
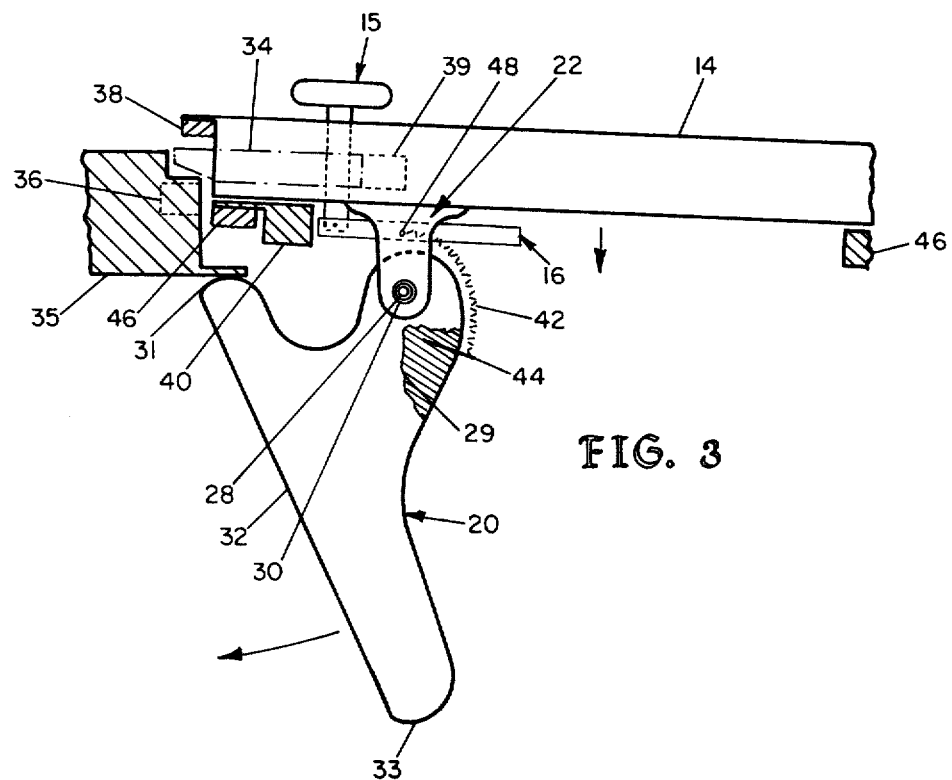
Figure 4:
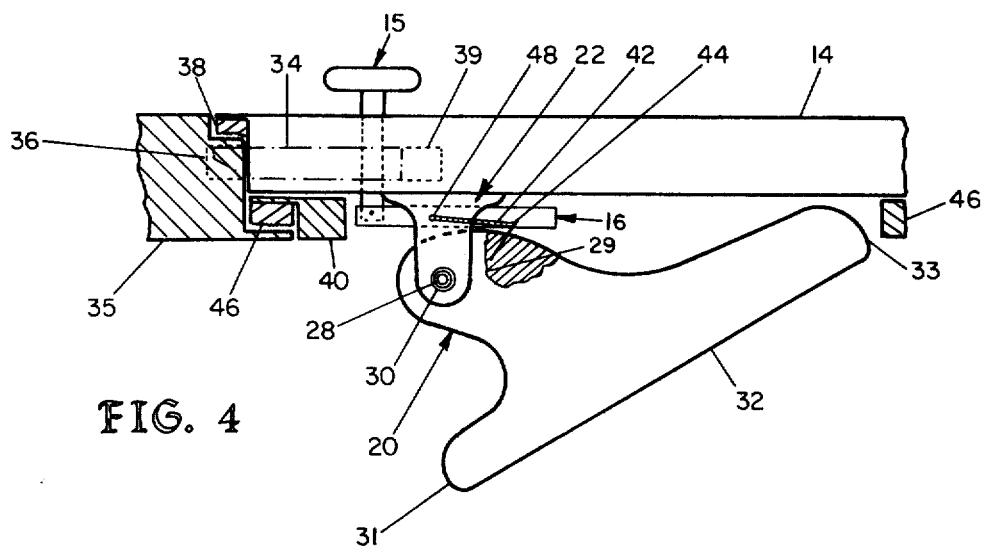

FIGS. 3 and 4 illustrate the operation of the silent door closing device. Referring now to FIG. 3, the silent door closing device 20 is shown in the preferred embodiment in its normal operating position nearly fully extended to begin to apply the necessary pressure to close the door 14. As the pivotable flat lever body 32, which is made of any suitable material but usually of plastic which may be transparent if desired, is pivoted by grasping the flat lever body 32 of device 20 in the hand of the user or operator, the rounded end 31 of the flat lever body 32 makes contact silently with the trailer door jam 35 thus allowing leverage to be applied by the user and pulling the trailer door 14 inwardly. As the trailer door is thus pulled inwardly by the user who grips the other rounded lever body end 33, the trailer door latch-bolt 34 is first retracted into its receptacle 39 by the closing action as aforesaid, and then the trailer door latch-bolt 34 inserts by typical spring loading means into the door jam striker plate 36. During this inward travel of the trailer door 14, the outer trailer door handle 15 and inner trailer door handle 16 are not operated in any way by the user and are merely allowed to move as happens during the door closing operation.

The door jam 35 shown in FIGS. 3 and 4 is of a conventional design typical of the structure of travel trailers, motor homes and the like. The trailer door seal 38 and the trailer inside screen door seal 46 which both are affixed to the trailer door 14 and the inside trailer screen door 40 respectively both must be significantly compressed in order to allow the trailer door latch-bolt 34 to travel inwardly a sufficient distance to allow said trailer door latch-bolt 34 to drop into the door jam striker plate 36 thus closing the door. After the trailer door 14 has been closed, the operator merely releases his grasp from the rounded end of the lever body 33.

After the operator has thus released his grip, a spring 42 which is connected at one end to a pin 48 of the bracket 22 of the device 20, and at the other end to pin means 44 fixedly secured within the hub 29 of the lever body 32 then returns the flat lever body 32 to its normal position with respect to the trailer door 14 as shown in FIGS. 2 and 4.

The door closing operation required in the absence of this invention wherein the person wishing to close the door attempts to use the conventional outside trailer door handle 15 or the conventional inside trailer door handle 16 to do so, requires a sudden noisy slamming of the door and a significant force must be exerted to compress the door seals 38 and 46 which frequently damages the trailer door 14 or one of its parts in some way.

It can now be seen that the operation of an improved silent door closing device has been clearly disclosed. The presently shown silent door closing device is particularly well adapted for attachment to a conventional travel trailer or motor home after it has left the factory. This device is of particular advantage to individuals who travel extensively with their travel trailers and motor homes thus affording a continual opening and closing of their trailer or vehicle doors. If desired the silent door closing device 20 may be mounted in any desirable location on the trailer door 14 though the preferred embodiment is either directly above or below and in reasonably close proximity to the inside trailer door handle 16.

The silent door closing device 20 may be constructed of any suitable materials. The device may be supplied as an attachment or it may be built in the travel trailer, motor home or other applicable unit as it is manufactured.

It can now be seen that the object of the invention has been fully achieved. Changes and modifications can be made which will not depart from the spirit of the invention as disclosed nor from the scope thereof as defined in the appended claims, of course.

In a general manner, while there has been disclosed an effective and efficient embodiment of the invention, it should be well understood that the invention is not limited to such an embodiment, as there might be changes made in the arrangement, disposition, and form of the parts of the door closing device without departing from the principle of the present invention as comprehended within the scope of the accompanying claims.

I claim:
1. A silent trailer door closing device comprising
   a bracket adapted to be attached to the inner side of a trailer door, and
   an elongated lever body having rounded ends and hub means pivotally connected to said bracket for swinging movement, and
   a resilient member having connecting means to said lever body and bracket for urging said lever body to a normal position substantially in vertical parallel position with respect to the trailer door, and
   a trailer door and door frame means against which said lever body operates to exert pressure thus pulling the door inwardly to the closed position by compressing the rubber door and frame seals until the door bolt is firmly latched,
   wherein an operator can close said door silently by grasping the lever body in its normal position, then pivoting said lever body until the elongated end of said body engages the trailer door frame and said operator exerts sufficient force against said door frame to pull the door inwardly to a fully closed position wherein the rubber door and frame seals have compressed sufficiently to allow the door bolt to fully latch.

2. The elongated lever body having rounded ends and hub means of claim 1 wherein said body is narrower at one end.

3. The elongated lever body having rounded ends and hub means of claim 1 wherein said body is made of plastic.

* * * * *